United States Patent [19]

Eling et al.

[11] Patent Number: 5,278,120
[45] Date of Patent: Jan. 11, 1994

[54] CATALYST COMPOSITION

[75] Inventors: Berend Eling, Bertem; Dominique M. Nachtergaele, Wielsbeke, both of Belgium

[73] Assignee: Imperial Chemical Industries PLC

[21] Appl. No.: 756,647

[22] Filed: Sep. 9, 1991

[30] Foreign Application Priority Data

Sep. 27, 1990 [GB] United Kingdom ............... 9021051

[51] Int. Cl.$^5$ ............................................ B01J 31/00
[52] U.S. Cl. ................................... 502/164; 502/170
[58] Field of Search ............................. 502/164, 170

[56] References Cited

U.S. PATENT DOCUMENTS

| | | | |
|---|---|---|---|
| 3,954,684 | 5/1976 | Farrissey, Jr. et al. | 260/2.5 AW |
| 3,980,594 | 9/1976 | Fabris et al. | 260/2.5 AC |
| 4,126,741 | 11/1978 | Carleton et al. | 528/57 |
| 4,136,240 | 1/1979 | Zimmerman et al. | 521/115 |
| 4,186,255 | 1/1980 | Klein et al. | 521/128 |
| 4,256,847 | 3/1981 | Spector | 521/117 |
| 4,771,025 | 9/1988 | Eling et al. | 502/164 |

FOREIGN PATENT DOCUMENTS

| | | |
|---|---|---|
| 0010407 | 4/1980 | European Pat. Off. |
| 0228230 | 7/1987 | European Pat. Off. |
| 0293211 | 11/1988 | European Pat. Off. |
| 0294110 | 12/1988 | European Pat. Off. |
| 354712 | 2/1990 | European Pat. Off. |
| 2527242 | 2/1976 | Fed. Rep. of Germany. |

*Primary Examiner*—Helen M. S. Sneed
*Assistant Examiner*—Brent M. Peebles

[57] ABSTRACT

1. A catalyst system comprising
1) an alkali metal or tetralkylammonium carboxylate having the formula

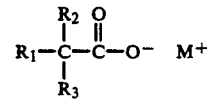

and
2) a strontium, barium or zinc carboxylate having the formula

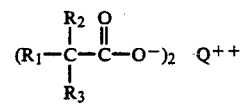

wherein M represents an alkali metal or tetralkylammonium, Q represents strontium, barium or zinc and $R_1$, $R_2$ and $R_3$ are the same or different and represent H or lower alkyl, cycloalkyl, phenyl or alkylphenyl and wherein the molar ratio of the alkali metal or tetralkylammonium carboxylate to the strontium, barium or zinc carboxylate is 1:1.1–10. The catalyst system is in particular useful for preparing molded objects according to the SRIM process.

8 Claims, No Drawings

CATALYST COMPOSITION

The present invention is concerned with a novel catalyst combination, a polyol and a reaction system comprising such catalyst combinations, a process for preparing moulded objects in particular according to the structural reaction injection moulding (SRIM) process by using such catalyst combinations and to moulded objects so prepared.

SRIM is known in the art. It includes processes wherein a mat of reinforcing material is placed in a mould and a liquid reaction system is injected through the mat, thereby forming a reinforced moulded object.

In the polyurethane/polyisocyanurate arts the liquid reaction systems result from an "A" component, a liquid stream containing a polyisocyanate, being impingement mixed with a "B" component, a liquid stream containing isocyanate-reactive components such as a polyol and chain extender components. Various catalysts can also be included to promote the formation of urethane and isocyanurate linkages.

The reaction system on one hand, desirably possesses a rapid cure time. SRIM, on the other hand, due to the presence of the reinforcing material, presents special demands since gel times must be long enough to allow mould filling and substantially complete penetration of the mat so that the reinforcing material is fully wetted and the occurrence of voids are minimised, thereby providing a moulded composite with good mechanical reinforcement. As reinforcing material e.g. a continuous mat or chopped fiber strand mat may be used. Clearly the requirements for SRIM systems can therefore be quite demanding.

Catalysts for preparing polyisocyanurates have been disclosed in European Patent Application 86 309 772.1

The preparation of isocyanurate containing polymers according to the RIM process has been disclosed in U.S. Pat. No. 4,126,741 and EPA 354712.

Surprisingly a novel catalyst system has been found which allows sufficiently long injection times—due to reduced early reactivity—in SRIM systems whilst maintaining fast demould times. The catalyst system may be combined with the isocyanate-reactive compounds used for preparing the moulded objects, such compositions being storage stable.

Consequently the present invention is concerned with a catalyst system comprising
1) an alkali metal or tetralkylammonium carboxylate having the formula

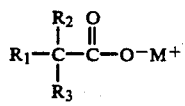  (Formula 1)

and
2) a strontium, barium or zinc carboxylate having the formula

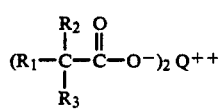  (Formula 2)

wherein M represents an alkali metal or tetralkylammonium, Q represents strontium, barium or zinc, and $R_1$, $R_2$ and $R_3$ are the same or different and represent H or lower alkyl, cycloalkyl, phenyl or alkylphenyl and wherein the molar ratio of the alkali metal or tetralkylammonium carboxylate to the strontium, barium or zinc carboxylate is 1:1.1-10.

The two carboxylates may be derived from the same acid or may be different. A mixture of different alkali metal or tetralkylammonium carboxylates of formula 1 and/or a mixture of strontium, barium or zinc metal carboxylates of formula 2 may also be used. The term "lower alkyl" means an alkyl group, branched or straight, having from 1 to 12 carbon atoms.

In both chemical compounds, $R_1$ is preferably selected from H and methyl, $R_2$ from H, methyl and ethyl, and $R_3$ from methyl, ethyl, isopropyl, butyl and cyclohexyl. Most preferably $R_1$ is H, $R_2$ is $C_2H_5$ and $R_3$ is $C_4H_9$.

The alkali metal salt is preferably a potassium salt but this may be fully or partially replaced by the corresponding sodium, rubidium or cesium salt. Suitable tetralkylammonium salts are the (2-hydroxyethyl)trimethylammonium and the tetrabutylammonium salt. Other ammonium salts susceptible to promote the polyisocyanate trimerisation are disclosed in U.S. Pat. Nos. 4,186,255, 3,954,684 and 3,980,594. Amongst the strontium, barium and zinc carboxylates the strontium carboxylates are preferred.

Suitable acids include for example hexanoic acid, 2-methyl hexanoic acid, 2-ethylhexanoic acid, cyclohexyl-acetic acid, trimethyl acetic acid, iso valeric acid and butyric acid.

The carboxylates used in the catalyst system according to the present invention and their preparation are known. Reference is made in that respect to EPA 86 309 772.1

The catalyst combinations described hereinabove specifically require the use of the two catalyst components in combination. Preferably these two catalyst components are used in a molar ratio of alkali metal or tetralkylammonium carboxylate to strontium, barium or zinc carboxylate of 1:1.2 to 1:5.

The amount of alkali metal salt used can be varied in concentration of between 0.4 and 6.0 mmol alkali metal or tetralkylammonium ions/100 gr of polyol blend and the amount of strontium, barium or zinc salt may be varied between 0.5 and 10 and preferably, in particular for the barium catalyst, between 0.5 and 5 mmol metal ions/100 qr of polyol blend.

The catalyst system according to the present invention may be used for preparing compounds and polymers comprising isocyanurate groups, like urethane and/or urea and isocyanurate comprising polymers. The catalyst system is useful for preparing moulded objects and in particular for the preparation of reinforced moulded objects according to the RIM process, especially the SRIM process.

Conventionally an organic polyisocyanate and one or more isocyanate-reactive compounds like polyols, are used for preparing such moulded objects, if desired in conjunction with conventional additives, like surfactants, flame retardants, further catalysts like polyurethane formation enhancing catalysts or other isocyanurate formation enhancing catalysts, internal and/or external mould release agents and the like. Any of these conventional systems may be used together with the catalyst system according to the present invention. Consequently the present invention is further concerned with a reaction system comprising an organic polyisocyanate, an isocyanate-reactive compound and a catalyst system according to the present invention.

The catalyst system may be used separately but, preferably, is combined with the isocyanate-reactive compound or composition before the reaction with the polyisocyanate takes place. Therefore, the present invention is further concerned with an isocyanate-reactive composition comprising a catalyst system according to the present invention.

Still further the present invention is concerned with a process for preparing an isocyanurate containing polymeric material by reacting an organic polyisocyanate and an isocyanate-reactive compound in the presence of a catalyst system according to the present invention.

In particular the isocyanate-reactive composition and the process according to the present invention are useful for preparing reinforced moulded objects according to the RIM process, and especially according to the SRIM process.

An organic polyisocyanate conventionally used in the preparation of SRIM objects can be used in accordance with the present invention.

A useful class of organic polyisocyanates are the aromatic polyisocyanates like polymethylene polyphenylpolyisocyanates, methylenebis(phenylisocyanates) and toluenepolyisocyanates and in particular a polymethylene polyphenylisocyanate mixture comprising from about 30 percent to about 80 percent by weight of methylenebis(phenylisocyanate) and the remainder of said mixture being polymethylene polyphenylisocyanates of functionality higher than 2; methylenebis(phenylisocyanate) (known in the art as MDI), both the 4,4'-isomer and mixtures of 4,4'- with 2,4'- in various proportions; the various types of liquified 4,4'-methylenebis(phenylisocyanate) commonly known in the art, in particular uretidinedione modified polyisocyanates and isocyanate terminated prepolymers also known in the art.

In most cases the isocyanate-reactive ingredient used is a combination of at least two isocyanate-reactive compounds, i.e. at least one softblock component and at least one chain extender and/or cross-linker.

Softblock components useful herein include those conventionally used in the art. The term "softblock" is well known to those in the art. It is the soft segment of a polyurethane, realising that the polyurethane may encompass isocyanurate rings.

Isocyanate-reactive materials useful as reactants which furnish softblock segments herein are well known to those skilled in the art. Such compounds will in general have a molecular weight of at least 1500, preferably 1500 to 8000, a number-average equivalent weight from 500 to 3000, preferably from 750 to 2500, and a number-average functionality of isocyanate-reactive groups of at least 1.1, preferably from 2 to 4. Such compounds may be selected from e.g. polyether or polyester polyols comprising primary or secondary hydroxyl groups.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable oxides include, for example, ethylene oxide, propylene oxide, 1,2-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high mocecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenylmethane, 4,4'-diaminodiphenylmethane, 1,3-phenylenediamine, 1,4-phenylenediamine, naphthylene-1,5-diamine, triphenylmethane 4,4',4"-triamine, 4,4'-di(methylamino)-diphenylmethane, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetra-ethyl-4,4'-diamino-diphenylmethane and amine aldehyde condensation products such as the polyphenylpolymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g., with halogen atoms) and/or unsaturated. Examples of carboxylic acids of this kind include succinic acid; adipic acid; suberic acid, azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophtalic acid anhydride; glutaric acid anhydride; maleic acid; maleic acid anhydride; fumaric acid; dimeric and trimeric fatty acids, such as oleic acid, which may be in admixture with monomeric fatty acids; terephthalic acid dimethyl ester; therephthalic acid bisglycol ester and the like. Mixtures of such acids or anhydrides may also be employed.

Examples of suitable polyhydric alcohols include ethylene glycol; 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane); 2-methyl-1,3-propane diol; glycerol; trimethylol propane; 1,2,6-hexane triol; 1,2,4-butane triol; tri-methylol ethane; pentaerythritol; quitinol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

As chain extenders conventional ones may be used. In general such chain extenders have a molecular weight below 1500 and preferably of 62 to 750 and a functionality of 1.8 to 3 and preferably of 1.9 to 2.2 Suitable chain extenders may be selected from polyols like ethylene glycol, diethylene glycol, butanediol, dipropylene glycol and tripropylene glycol; aliphatic and aromatic amines especially the secondary ones, e.g. 4,4'-methylene dianilines having a lower alkyl substituent at each N atom; imino-functional compounds like those disclosed in European Applications 284253 and 359456 and enamino-functional compounds like those disclosed in European application 359 456. As cross-linking those commonly known in the art may be used like e.g. optionally oxyalkylated glycerol, pentaerithritol, sucrose, sorbitol and oxyalkylated polyamines. The functionality of the cross-linkers may range from 3-8 and the molecular weight may vary between the same ranges as for the chain extender. The liquid reaction components are processed by the reaction injection moulding (RIM) process in a RIM machine. The polymeric moulded articles which result comprise the reaction product of two liquid streams, an "A" component, a polyisocyanate, and a "B" component comprising the isocyanate-reactive materials such as softblock and chain extender.

Examples of RIM machines include those manufactured by Admiral Equipment Corp., Akron, Ohio, by Cincinnati Milacron Corp., Cincinnati, Ohio, Battenfeld Corporation, West Germany and by Krauss Maffei GmbH, West Germany, and by Cannon, Italy among others.

The "A" and "B" Components are placed in separate containers, which are generally equipped with agitators, of the RIM machine wherein the temperature of the "A" and "B" Components are 20° to 80° C.

The "A" Component and "B" Component are impingement mixed in a forced mix head such as, for example, a Krauss-Maffei mix head. The "A" and "B" Components are pumped to the mix head by a metering pump, for example, a Viking Mark 21A. It is generally necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The reactants can be all at ambient room temperature (about 20° C.) when brought together, or alternatively, one or all of the components can be at an elevated temperature up to about 80° C. if a faster reaction is desired.

The impingement-mixed mixture of "A" and "B" components is pumped into a mould in which a mat of reinforcing material like structural fibres has been placed. Glass is preferred as the structural fiber, although other fiber materials can also be used, including carbon, graphite, silicon carbide, alumina, titania, boron, aromatic polyamide, and the like. The final reinforced moulded article can contain between 5 and 85 wt. % of reinforcing material based on the weight of the article.

After the resin has been moulded the curing phase will depend on the particular reactants, catalyst levels, reactant temperature, and the like. Generally speaking, the moulded part will be cured for 15 seconds-15 minutes at a mould temparture of at least 30° C., especially 60°-90° C. Optionally, the in-mould cure can be followed by a postcure period typically at temperatures of 110°-180° C. for 0.25-2 hours or by standing at ambient temperatures for 1-24 hours.

In operating the method of the invention, the polyisocyanate component and the isocyanate-reactive component are typically reacted at an isocyanate index between 70 and 2500, the isocyanate index being the ratio of isocyanate equivalents to isocyanate-reactive functional groups. Preferably, the index is between 95 and 1200, more preferably between 100 and 1000, still more preferably between 300 and 800 and most preferably between 450 and 750.

The invention is illustrated by means of the following examples.

EXAMPLES 1-7

Magnesium-, calcium-, strontium-, barium- and zinc 2-ethylhexanoate were dissolved or dispersed in tripropyleneglycol (TPG) at a weight ratio of carboxylate to TPG of 40 to 60. These catalyst solutions or dispersions were combined with other catalysts and polyol by hand mixing. Polyisocyanate and the polyol blend, which both had been conditioned at 60° C., were reacted at an isocyanate index of 666. In these experiments the amount of chemicals that were reacted amounted to 100 g. The chemicals were mixed in a paper cup at a mixing speed of 2500 rounds per minute during 5 seconds. The further ingredients and the amounts in parts by weight are indicated in Table 1 and the gel time was determined.

TABLE 1

| Example | 1 | 2 | 3 | 4 | 5 | 6 | 7 |
|---|---|---|---|---|---|---|---|
| Lubrol FSA | 94 | 94 | 94 | 94 | 94 | 94 | 94 |
| Dipropylene glycol | 3.73 | 3.73 | 3.73 | 3.73 | 3.73 | 3.73 | 1.94 |
| Tripropylene glycol 1) | 1.27 | 1.27 | 1.27 | 1.27 | 1.27 | 1.27 | 3.82 |
| Dabco T-45 | 0.4 | 0.4 | 0.4 | 0.4 | 0.4 | 0.4 | 0.4 |
| Polycat-41 | 0.2 | 0.2 | 0.2 | 0.2 | 0.2 | 0.2 | 0.2 |
| Carboxylate: | | | | | | | |
| amount | — | 0.62 | 0.65 | 0.75 | 0.85 | 0.72 | 2.54 |
| type | — | Mg | Ca | Sr | Ba | Zn | Ba |
| Suprasec VM 20 | 150 | 150 | 150 | 150 | 150 | 150 | 150 |
| GEL time (sec) | 6 | 6 | 30 | 28 | 16 | 12 | 30 |

1) including TPG used to dissolve/disperse the carboxylate.

Lubrol FSA is a commercially obtainable two-functional polyol having an hydroxyl value of 52 mg KOH/g.
Dabco T-45 is a potassium-2-ethylhexanoate based catalyst which is commercially available, it contains about 3.6 mmol K+ per gram.
Polycat 41 is a tertiary amine catalyst which is commercially available.
Suprasec VM 20 is a commercially obtainable modified, liquid polyisocyanate from Imperial Chemical Industries PLC having an NCO value of 29.1% by weight.
Remarks: Experiments 1-6:
  The Mg- catalyst did not show any delay of the gelation.
  The Ca- and Sr- catalyst showed the best delay of the gelation. However the polyol blend containing the Ca-catalyst is not stable while the blend containing the Sr-catalyst was stable. The Ba- and Zn-catalyst showed delay of gelation, the effect of the delay being less than for the Ca- and Sr-catalyst. The stability of the polyol blend containing the Ba-catalyst was borderline and the one containing the Zn-catalyst was good.
Experiment 7:
  By increasing the amount of the Ba-catalyst to a level that gave a delay of the reaction rate similar to that obtained with the Sr-catalyst an instable polyol blend was obtained.
Machine trials on a RIM machine from Battenfeld confirmed the delay of the gelation of the reaction mixture under normal SRIM conditions.

We claim:

1. A catalyst system for use in structural reaction injection molding processes comprising
   1) an alkali metal or tetralkylammonium carboxylate having the formula

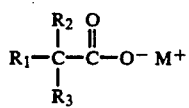

and
   2) a strontium, barium or zinc carboxylate having the formula

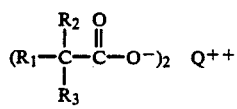

wherein M represents an alkali metal or tetralkylammonium, Q represents strontium, barium or zinc and $R_1$, $R_2$ and $R_3$ are the same or different and represent H or lower alkyl, cycloalkyl, phenyl or alkylphenyl and wherein the molar ratio of the alkali metal or tetralkylammonium carboxylate to the strontium, barium or zinc carboxylate is 1:1.1 to 1:10.

2. A catalyst system according to claim 1 wherein M is selected from potassium, (2-hydroxyethyl)trimethyl ammonium and tetrabutylammonium.

3. A catalyst system according to claim 1 wherein Q is strontium.

4. A catalyst system according to claim 1 wherein the molar ratio of alkali metal or tetralkyl-ammonium carboxylate to strontium, barium or zinc carboxylate ranges from 1:1.2–5.

5. A catalyst system according to claim 1 wherein $R_1$ is selected from H and methyl, $R_2$ from H, methyl and ethyl and $R_3$ from methyl, ethyl, isopropyl, butyl and cyclohexyl.

6. A catalyst system according to claim 1 wherein $R_1$ is H, $R_2$ is $C_2H_5$ and $R_3$ is $C_4H_9$.

7. A catalyst system according to claim 1 wherein M is selected from potassium, (2-hydroxyethyl)trimethyl ammonium and tetrabutylammonium; Q is strontium; $R_1$ is H or methyl; $R_2$ is H, methyl or ethyl; $R_3$ is methyl, ethyl, isopropyl, butyl or cyclohexyl and the molar ratio of alkali metal or tetralkylammonium carboxylate to strontium carboxylate is 1:1.2–5.

8. An isocyanate-reactive composition comprising a catalyst system according to claim 1.

* * * * *